July 31, 1962  G. B. BREEN ETAL  3,046,698
APPARATUS FOR COLLECTING SAP
Filed Feb. 24, 1959  3 Sheets-Sheet 1
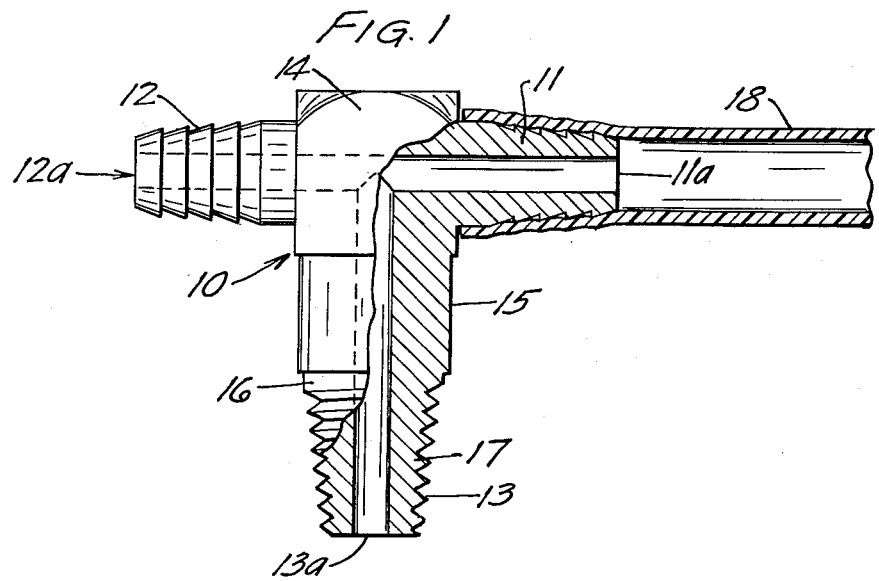
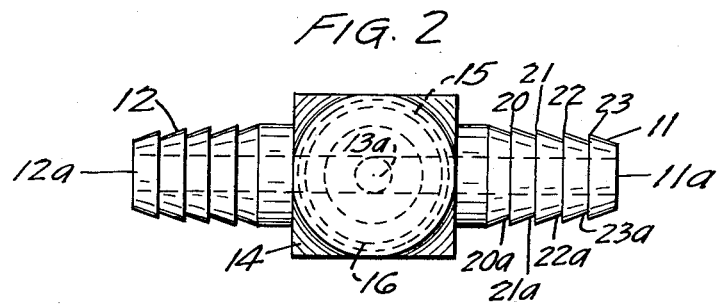
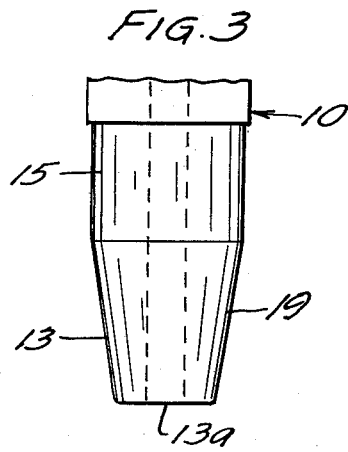
INVENTORS
GEORGE B. BREEN
JOHN E. CAHILL
BY
Carpenter, Abbott, Coulter & Kinney
ATTORNEYS July 31, 1962 G. B. BREEN ETAL 3,046,698
APPARATUS FOR COLLECTING SAP
Filed Feb. 24, 1959 3 Sheets-Sheet 2
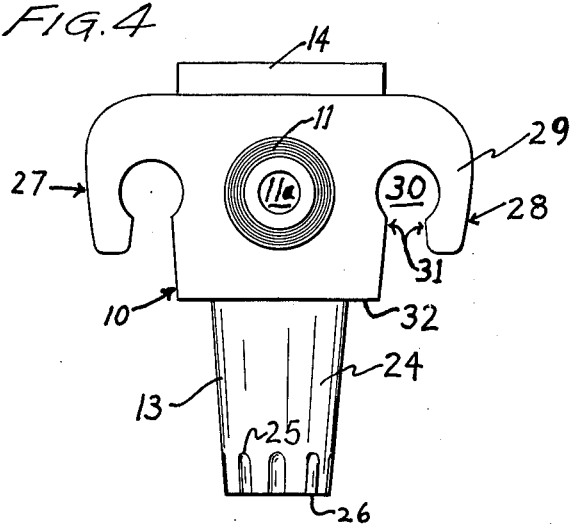
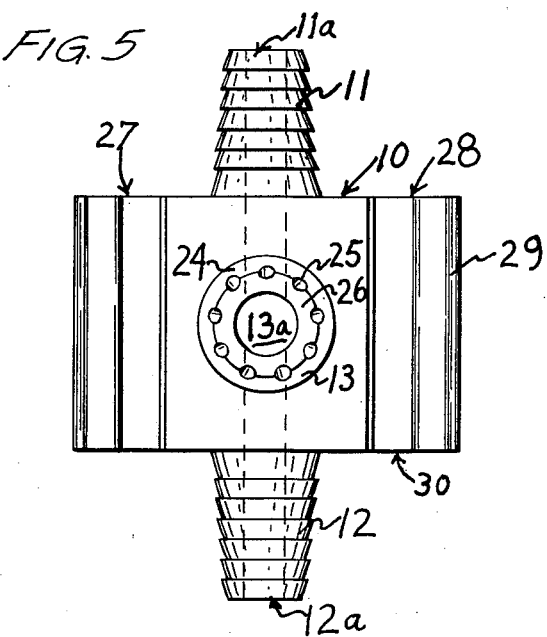
INVENTORS
GEORGE B. BREEN
JOHN E. CAHILL
BY
Carpenter, Abbott, Coulter & Kinney
ATTORNEYS July 31, 1962 G. B. BREEN ETAL 3,046,698
APPARATUS FOR COLLECTING SAP
Filed Feb. 24, 1959 3 Sheets-Sheet 3

INVENTORS
GEORGE B. BREEN
JOHN E. CAHILL
BY
ATTORNEYS

United States Patent Office 3,046,698
Patented July 31, 1962

3,046,698
APPARATUS FOR COLLECTING SAP
George B. Breen, Jamaica, Vt., and John E. Cahill, Birchwood, Minn., assignors to Minnesota Mining and Manufacturing Company, St. Paul, Minn., a corporation of Delaware
Filed Feb. 24, 1959, Ser. No. 795,280
15 Claims. (Cl. 47—52)

This application is a continuation-in-part of our application filed January 24, 1958, Serial No. 711,104, which is a continuation-in-part of our application filed February 1, 1957, Serial No. 637,795, both now abandoned.

This invention relates to a new apparatus for collecting sap from trees.

Since colonial days maple sap has been collected by driving spouts or spiles into the base of maple trees, hanging buckets on the spiles to collect flowing sap, and thereafter removing the buckets of sap and transporting them, e.g., by toboggan, to a central reservoir or collecting point. The process is not only slow and laborious but inefficient. By the simplified apparatus and process hereof, up to approximately twice as much sap can be collected from the same trees as by the older prior art method.

In practicing our new simplified process for collecting sap, a tubular spout is first affixed in a tree near its base, through the bark and outer portion of the wood of the tree. A plastic tubing or conduit is connected between the spout in the tree and a central reservoir, and the pressure of the sap in the tree is allowed to govern the rate of flow of sap through the tubing from tree to reservoir. We have found it to be particularly desirable to suspend the plastic tubing in air above the snow level on the ground, so as to thereby obviate problems which may arise as a result of the tubing becoming buried and frozen in the snow. In practice, several trees are tapped and connected through plastic branch tubes to a main trunk tube or conduit which empties into the reservoir. The complete plastic tubing network is preferably suspended in air above the local snow level.

A particularly noteworthy advantage of our simplified sap collecting process lies in the fact that sap exuding or flowing from a tree is not exposed to the atmosphere at or near the point of its exudation or flow. In other words, it is not exposed to air at the point of its flow out of the tap hole in the tree. Using the older prior art method, tap holes cake over and become clogged as a result of air contacting the sap as it flows out of the tap hole. It is even possible that some air enters the tree through the tap hole and contributes to clogging. Heretofore, therefore, it has been necessary, sometimes as frequently as twice a day, to make rounds reopening the tap holes to permit sap to flow for collection. By affixing a tubular spout in a tree and connecting plastic tubing between it and a reservoir as herein set forth, we provide a hydraulically closed system through which sap flows to a reservoir under the force of its own hydraulic pressure without contact with the atmosphere; thus problems of clogging and tap hole sealing by reason of air contacting the sap flow are obviated.

It has been found that tubes of flexible plastic materials, e.g., polyethylenes, vinyls, rubbery materials, etc., are of critical importance in collecting sap as described herein. Metal tubing or piping has been entirely unsatisfactory due to the fact that, in the climate where maple sap collecting operations are undertaken, a freezing problem exists, and the open passage of a metal conduit is effectively sealed once sap therein freezes, as occurs, for example, when the flow from trees stops or becomes very sluggish. Of course, freezing of sap also occurs in plastic tubing under certain conditions, as where the flow becomes negligible or sluggish during a time of below freezing weather; however, the frozen sap in plastic tubing surprisingly does not effectively prevent new sap from flowing through the plastic tubing from tree to reservoir. Warm sap from trees, being under a significant pressure, forces its way out into the plastic tubing and dilates such tubing, flowing between the inner walls thereof and the frozen core or residue of sap in the center. Relatively rapid thawing of the frozen core is thereby brought about as the sap under its own pressure dilates the plastic tubing and forces its way between the frozen core and the tubing walls. Shortly thereafter the conduits are open for maximum flow of sap from the tree. As required, maple sap picks up no harmful tastes or impurities as a result of its passage through the plastic tubing.

The fact that plastic tubing is expandable under certain conditions is a property inherently contributing to the success of our new sap collecting operations as described above, but has also been the source of much difficulty in conducting such operations. Connections between lengths of plastic tubing and between plastic tubing and tree spouts are subjected to the pressure of flowing sap and tend to break as a result of such pressure, or to part easily under the tension applied to them when rearranging tubing. Wind-fallen tree branches dropping on the tubing tend to pull it from a plastic connector to which it is affixed. Slippery connections due to sap, snow, moisture, etc., have also been the source of difficulty.

To obviate such parting of tube from connector we have devised a new type of conduit connector to which plastic tubing may be securely affixed by simply pushing the tubing over a connector extension. Once in place the tubing cannot be stripped from the connector extension except by the application of forces considerably in excess of those employed in placing it on such extension. Under the application of such forces, the end of the tube on the conduit connector is apt to be damaged before the tubing is stripped therefrom. Even when plastic tubing or connectors are wet, our connector grips and holds the tubing in position thereon. The necessary forces required for stripping tubing from our connector are not encountered in the usual sap collecting operations. Even the dilation of plastic tubing caused by the pressure of warm sap flowing between the inner walls of the tubing and a frozen core therein is not sufficient to strip the tubing from our connectors.

Another problem in conducting sap collecting operations as above described is that of providing the trees with suitable spouts which prevent sap leakage and take full advantage of sap pressure in the trees, as well as which are easily removable and reusable, and to which plastic tubing can be securely affixed. We provide a combination spout and conduit connector of such required type which is so constructed that operational disconnection of the plastic tubing from the connectors thereof is obviated by novel tube clamping means preventing the occurrence of any forces tending to strip the associated tubes from the connectors, while allowing for expansion and contraction of the tubes with changes in temperature. The combination spout and conduit connector is also constructed in a manner to prevent clogging of the spout by wood chips or the like left in the tree bore, and is further constructed in a manner to prevent clogging as a result of entrained foreign matter. The spout-connector device successfully prevents leakage, takes advantage of sap pressure, and is easily removed from a tree for reuse when desired, said device being provided with means facilitating the prying thereof from the tree bore, as well as with means at the inner end of the spout thereof adapted to grippingly engage the wall of the bore to aid in retaining the device in operative position within the bore as well as to prevent rotation therein.

The essential features of our invention will be described with reference to the drawings accompanying and forming a part of this specification, wherein:

FIGURE 1 is a plan view, partly in section, of one form of combination spout and connector;

FIGURE 2 is a front or outer end elevation of the spout-connector of FIGURE 1;

FIGURE 3 is a fragmentary plan view illustrating a modified form of spout-connector;

FIGURE 4 is a side elevation of another form of spout-connector;

FIGURE 5 is an inner end elevation of the spout-connector shown in FIGURE 4;

Figure 6:
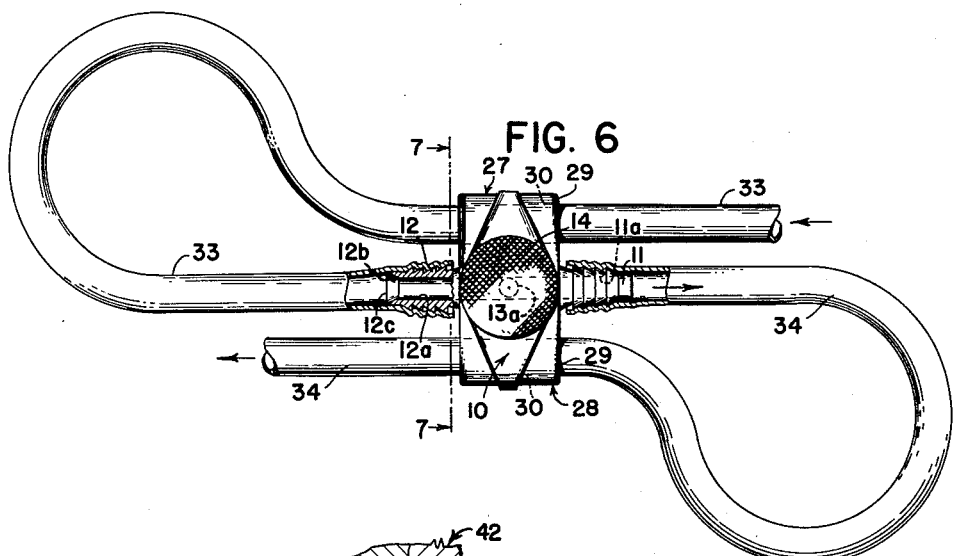
FIGURE 6 is a front elevation of still another form of spout-connector shown in operative position and connected into a sap collecting system.

Referring to the drawing, our composite spout and conduit connector comprises a body portion 10 off which extend, as illustrated in the drawing, three conduit members 11, 12 and 13. A conduit space or tubular channel in each conduit member meets in a common chamber in body 10. For convenience of description, these conduit spaces are numbered 11a, 12a and 13a, the conduit spaces 11a and 12a being shown as coaxial and normal to the conduit space 13a. (In FIGURE 4, which is an external side elevation of one embodiment of our spout-connector article, conduit space 13a in member 13 is not shown, and conduit space 11a is shown superimposed over conduit space 12a.)

Integral with body 10 is a reinforced or solid head portion 14 which is sufficiently sturdy to withstand the blows of a hammer such as used to pound conduit member 13 into a tree. As may be evident, head 14 protects conduit spaces within the body 10 against collapse during hammering. Member 13 is termed a tubular spout and is a spile member or segment adapted for embedding into a tree, as will be further explained.

Referring now to FIGURES 1, 2 and 3, opposite solid head portion 14, and consisting of a part of member 13, is an annular non-threaded trunk segment 15 through which conduit space 13a extends, preferably with the axis of the conduit common with the axis of the annular trunk segment. The length of this annular trunk segment suitably is approximately the same as the thickness of the average bark layer of trees in which member 13 is to be embedded. A length of about ⅜ inch for this segment has been found suitable for maple tree use.

Adjacent the trunk segment, on the side thereof away from the body portion 10, preferably is located a further annular shoulder segment 16, i.e., a "seal segment," having a common axis with the trunk segment but a diameter of reduced size as compared to the trunk diameter (see FIGURES 1 and 2). This shoulder segment 16 may be entirely omitted, if desired, but serves advantageously as an auxiliary member to prevent sap leakage when the terminal portion of member 13 and segment 16 are embedded into the wood of a tree. The terminal portion 17 of spout member 13 is tapered and, as illustrated in FIGURE 1, screw threaded so as to permit convenient removal of the tubular spout from a tree by simply unscrewing the same after it has served its purpose.

FIGURE 3 illustrates an alternative embodiment of spout member 13 wherein the terminal portion 19 is tapered from annular trunk segment 15. This terminal portion has a smooth annular surface, as distinguished from the threaded surface aforedescribed. Terminal portion 19 extends off annular trunk segment 15 in this embodiment and is integral therewith.

Laterally off the body 10 extend tapered coaxial conduit connectors 11 and 12. These connectors are essentially normal to the axis of the spout member 13. Connectors 11 and 12 are of similar construction and thus will be described together, with particular reference to connector 11 for details.

An important feature of these tapered connectors 11 and 12 is that they are provided with a plurality of annular ridges, illustrated at 20, 21, 22 and 23 in the drawing. These ridges are separated by annular grooves 20a, 21a, 22a and 23a. The ridges are not razor sharp cutting edges but do come to a point and are characterized as "sharp" ridges so as to distinguish them from those having a flat plateau or the like. They are sufficiently sharp so as to cut slightly into the interior of a plastic tube placed thereover and hold it against forces tending to draw it from the connector. As illustrated in the drawing, the sharp edge of the ridges is directed toward the body 10 of the article; thus, during the action of sliding a plastic tube on a connector, the sharp edges of the ridges, being directed away from the direction of the movement of the tube over the connector, essentially do not interfere with the emplacement of the tube on the connector. In fact, their configuration along the tapered connector tends to facilitate easy pushing of the tube over the tapered connector. Once emplaced on the connector, however, the tube, illustrated at 18 in the drawing, becomes difficult, if not impossible, to remove. The force of pulling the tube off the connector and the inherent contracting action of the plastic tube stretched over the connector, cause the ridges to "dig" into the interior portion of the tube and hold it in place on the tapered connector.

The general taper of conduit connectors 11 and 12 is not upset by the presence of annular ridges along the tapered portion thereof. Thus, as between any two annular ridges located along the taper of a conduit connector, the diameter of the annular ridge located nearest the body portion 10 of the article is greater than the diameter of the ridge located farther away from the body portion. The diameter of the annular ridge located nearest the terminal portion of the connector is smallest, and the diameter of each annular ridge nearer the body portion 10 is slightly larger than that of the adjacent ridge farther away from the body portion 10. In the drawing, the diameters of annular ridges 20, 21, 22 and 23, are illustrated as being successively smaller, or graduated in size, toward the end of the connector.

Another form of spout-connector is illustrated in FIGURES 4 and 5 and comprises a spout member 13 in the form of a tapered tubular segment 24 extending directly from body portion 10. At the terminal end 26 of the spout member 24, and located about the outer portion of the member, are a plurality of longitudinal grooves 25 extending from the terminal end 26 of the spout member a short distance back along its outer tapered surface toward body portion 10. Sap from the outer portion of a tree in which the spout member is embedded tends to flow into these grooves, and is then directed toward the terminal end 26 of spout member 24, where it passes around the terminal end and into conduit space 13a for removal.

In addition to the foregoing features, the spout-connector illustrated in FIGURES 4 and 5, is provided with "stress-relief" means 27 and 28. The "stress-relief" means 27 and 28 illustrated take the form of arm or tube clamping members 29, which extend outwardly from opposite sides of the body 10 a short distance and then curve back toward body 10 so as to provide cylindrical recesses or channels 30 having constricted side openings 31. The recesses 30 are of a size slightly smaller than the outer diameter of the plastic tubing to be attached to connector members 11 and 12 and the axes of said recesses are preferably coplanar and parallel with the axis of said members as shown. Plastic tubing attached to member 11, for example, may be slipped into channel 30 by pressing it through constricted opening 31 extending the length thereof. Once the tubing is in place within the channel 30 it is firmly held or clamped therein sufficient to resist displacement by the tensile stresses ordinarily occurring in the tubing during normal operation. The tubing may, however, be manually slid axially in the channel 30 as will hereafter appear.

One of the major benefits to be gained by using these "stress-relief" devices is that of preventing plastic tubing from bending so sharply on the end of a connector member as to obstruct the flow of sap out of the connector into the tubing. Such a condition has been noted to arise particularly where the plastic tubing from a first spout connector member is suspended in air and stretched to a second connector member located at an angle with respect to a line through the first connector member. When plastic tubing from the end of a connector member, such as for example 11, is looped and inserted into a channel member 30, from which it is extended directly through the air (i.e., not dropped nor allowed to lie upon the ground) to another connector article, experience has shown that it bows slightly at the point of emergence from channel member 30, but does not bend so sharply as to obstruct the flow of sap therethrough. Thus these "stress-relief" means aid in maintaining maximum flowage of sap out of the spout-connector and into the plastic tubing of the collection system.

Another benefit gained from using "stress-relief" means 27 and 28 is that of being able to easily take care of slack or eliminate sags in plastic tubing lines, and thereby maintain the collection tubing network suspended in air above the snow level. Where slack in a tubing line develops, the tubing is merely shifted in position within channel member 30 so as to increase the size of the loop between a connector member such as 11 and channel 30. Moreover, the "stress-relief" means 27 and 28 substantially isolate the tube end portions on the connectors 11 and 12 from tensile stresses occurring in the tubing lines of which they are a part. This substantially completely eliminates any danger of said tube ends being pulled from said connectors by tensile stresses set up in the tubing lines between adjacent spout-connectors. When abnormally high tensile stresses do occur in the tubing lines, such stresses merely cause slippage of the tubing within the channels 30 and paying out of a length of the looped tubing portion.

Figure 7:
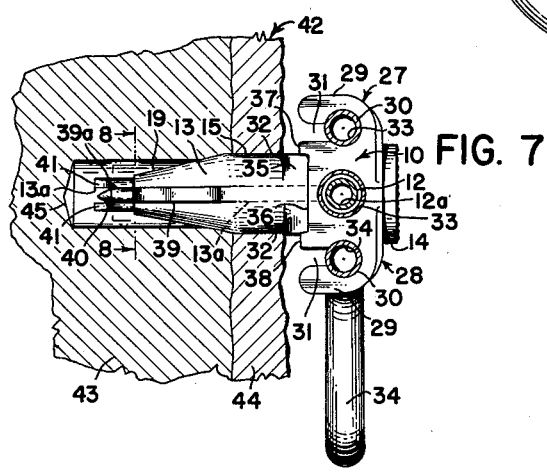
FIGURE 7 is a vertical sectional view taken approximately along the line 7—7 of FIGURE 6.
Figure 8:
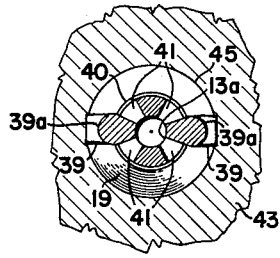
FIGURE 8 is an enlarged vertical sectional view taken approximately along the line 8—8 of FIGURE 7.

FIGURES 6 to 8 illustrate still another form of spout-connector constructed in accordance with the present invention, and said spout-connector is shown connected into a sap collecting system including plastic tubes 33 and 34. Referring to FIGURE 7 the spout member 13 comprises a segment 35 which is generally square in cross section, a tubular cylindrical segment 15, a tapered segment 19, and a reduced diameter tubular cylindrical segment 40. The juncture of segments 15 and 35 forms corner shoulders 32. Projecting from diametrically opposite sides of the tapered segment 19 are a pair of axially extending rectangular horizontal ribs 39 which may project radially a distance somewhat less than the radius of the cylindrical segment 15. Formed on the reduced diameter terminal segment 40 are a pair of rounded axially extending ribs 39a alined with and forming extensions of the rectangular ribs 39. The terminal portions of the rounded surfaces of ribs 39a are preferably conically tapered as shown. The tapered rounded ribs 39a facilitate insertion of the spout 13 in the tree bore shown at 45 in FIGURES 7 and 8. The rectangular horizontal ribs 39 dig into the opposite sides of the tree bore as shown in FIGURE 8 affording a firm connection therewith and also preventing rotation of the spout connector when in operative position.

The inner end of the reduced diameter tubular segment 40 is formed with a plurality, preferably four, equally spaced generally U-shaped grooves or notches 41 shown most clearly in FIGURE 8.

The grooves or notches 41 afford openings or strainer means through which sap can flow radially into the bore 13a of the segment 13 in the event that the open inner end of said bore should become blocked, for example by a wood chip floating in the sap within the tree bore.

As shown in FIGURE 7, the body 10 is formed with upper and lower vertical shoulders 37 and 38, respectively, and is formed with a pair of oppositely disposed vertical side shoulders 36, only one of which is shown in FIGURE 7. The shoulders 36 to 38 facilitate intentional removal of the spout-connector from a tree by affording surfaces for engagement by prying tools. The shoulders thus permit ready removal of the spout connector without any danger of breakage of the arms 29 or connectors 11 and 12. It will be observed that the shoulders 36 to 38 are spaced outwardly from the shoulders 32 which define the limits of insertion of the spout 13 into the tree bore by engagement with the bark 44 of the tree 42 as shown in FIGURE 7.

Referring to FIGURE 6, it will be observed that the head portion 14 of body 10 is knurled to minimize slippage thereon of a mallet or hammer which may be used for driving the spout connector into a tree bore. The tubular connectors 11 and 12, as in the other forms of the spout connector, are tapered and are formed with annular shoulders having sharp edges directed toward the body portion 10.

As aforementioned, the spout connector in FIGURE 6 is shown connected into a sap collecting system. In the system shown, the tube 33 is adapted to conduct sap from trees upstream in the system, and the tubular connector 12 comprises an inlet connector for such sap, whereas the connector 11 serves as an outlet connector to which the tubing 34 is connected. The tubing 34 conducts the sap supplied through the tubing 33, plus the sap collected by the illustrated spout-connector, to the inlet of the next spout connector in the system or directly to the reservoir (not shown), or to a branch or main trunk tube for ultimate delivery to the reservoir.

Means is provided for preventing clogging of the system by foreign matter becoming lodged at the inlet connectors 12. Matter such as wood chips and the like entrained in the flowing sap are prevented from causing such clogging by constructing the inlet connectors 12 in a particular manner. More specifically, the terminal portion of the inlet connector 12 is formed with a coaxial tapered bore 12b communicating with the main bore 12a thereof. The tapered bore 12b terminates at its outer end in an annular knife edge 12c at which the diameter of the tapered bore 12b is coincident with that of the outer surface of the end portion of connector 12. This construction insures the smooth flow of sap from tube 33 into the bore 12a of the inlet connection 12 by eliminating the flat end face from the connector 12 against which wood chips might become lodged and which might afford corners into which foreign matter could settle out and accumulate.

In the use of the aforedescribed and illustrated apparatus for maple sap collection, a small hole, such as at 45 in FIGURE 7, and of a diameter slightly less than the diameter of annular seal segment 16 of FIGURE 1 (or slightly less than the diameter of the base of the tapered threaded portion 17 of spout member 13 in the event seal segment 16 is omitted; or of a diameter approximately the same as the end of the tapered portion 19 of spout member 13 illustrated in FIGURE 3, or the end of tapered member 24 illustrated in FIGURES 4 and 5; or of a diameter slightly less than that of the cylindrical segment 15 of FIGURE 7) is first drilled into the wood 43 (FIGURE 7) of a maple tree 42 (FIGURE 7) near its base. Spout member 13 is then centered on the hole and hammered into the same by applying blows to head 14. Where articles of the configuration illustrated in FIGURES 4 and 5 or 6 to 8 are used, the spout 13 is hammered into the tree approximately until shoulder or shoulders 32 of body 10 bear against the outer bark. Where articles of the design in FIGURES 1 and 2 are used, the terminal threaded portion 17 of member 13, as well as seal segment 16, is driven into the wood of the maple tree, whereas trunk segment 15 extends through the bark layer of the tree. Similarly, trunk segment 15 of the articles shown in FIGURES 3 and 7 extends through the bark layer 44 (FIGURE 7) of the tree. As aforestated, the length of annular trunk segment 15 is approximately the same as the thickness of the average bark layer near the base of maple trees.

After embedding spout member 13 in the tree, the conduit connectors, such as 11 and 12 in the drawing, are positioned preferably horizontally and near but a very short distance away from the bark of the tree as shown in FIGURE 7, so that easy connection of plastic tubing to them can be accomplished. Relatively little leverage on spout member 13 is exerted by the resulting assembly of conduit connectors and plastic tubing adjacent the spout member. Flexible plastic tubes or pipes such as 34 and 33 of FIGURES 6 and 7 are connected to conduit extensions 11 and 12, respectively, in the manner aforedescribed, and are connected also to other similar combination spout-connectors of the aforedescribed type on other maple trees, and to branch lines, trunk lines, etc., which ultimately feed the sap into a central collecting reservoir. Where terrain permits, advantage is taken of the force of gravity in promoting sap flow. However, the pressure of sap in the trees is ordinarily sufficient to cause it to flow through the various conduits to the reservoir.

While the size of our aforedescribed article may vary, we have found that relatively small articles are suitable for maple sap collection use. To illustrate, we have formed one such article of the form shown in FIGURES 1 and 2 which had the over-all length of about 1½ inches between the tip of conduit connector 12 and the tip of conduit connector 11. This article had a height of about 1⅜ inches along a line through the head 14, body 10 and spout member 13. Conduit 13a in this article was about ⅛ inch in diameter, whereas conduits 11a and 12a were about 3/16 inch diameter, since the flow from several trees passes through these latter channels. We have, however, formed articles of the forms shown in FIGURES 4 to 8 of somewhat different dimensions. In some cases, we prefer to employ a larger and in some a smaller conduit diameter in member 13 than in connector members 11 and 12, for example as illustrated by a comparison of FIGURES 5 and 6.

It will be readily appreciated that variations in the exact configuration of the spout-connector here described and illustrated in our drawings may be made without departing from the essential characteristics of the invention.

Further it will be evident that connectors useful in the plastic tubing art may be made without a member such as tubular spout member 13 integral therewith. Such connectors may, for example, consist of conduit connectors 11 and 12 off body 10, with tubular channel 13a sealed. In some uses, it may be desired to employ a combination spout and conduit connector of the type illustrated in the drawings without a second conduit connector such as the conduit connector numbered 12 in the drawing. In such cases tubular channel 12a would be sealed. Possibly some uses may require a combination spout and conduit connector having more than two lateral tapered conduit connector members such as those numbered 11 and 12 in the drawing.

In some cases, it may be desirable to add notches or claw-like projections other than ribs such as the horizontal ribs 39 of FIGURES 7 and 8 on the outer surface of member 13 so as to increase the gripping action of the member when it is inserted into the wood of a tree. Where such is done, it may be desirable to form member 13 as a separate piece from body 10 and connectors 11 and 12, and to equip member 13 and body 10 with means, e.g., screw threads, for joining together. Advantageously such a structure for our article permits sap collectors to leave member 13 embedded in a tree at the end of a sap collecting season, thus reducing the tendency toward bacterial action as frequently found in open tap holes. In still other cases, member 13 may be so shaped as to fit removably into a special casing which is permanently inserted into a tap hole in a tree. These aforenoted modifications, as well as others related thereto, are within the broad scope of this invention and are comprehended in the appended claims.

The illustrated spout-connectors are preferably made of hard tough structural materials which preferably are corrosion resistant. Illustrative suitable materials to employ are aluminum, various metal alloys such as, for example, stanless steel, reinforced plastics such as, for example, polyamides ("nylon"), polystyrenes, etc. The illustrated spout-connectors are further preferably formed with all parts or components thereof as one integral unit, but parts of the composite article may be formed separately and later united or fitted together to form the integral whole.

Our articles are particularly useful in sap collecting operations as aforedescribed, but may have other advantageous uses in connecting conduits of the plastic type. For example, the spout member 13 may itself be embedded in the walls of a plastic conduit to make a connection therewith. Advantageously, a screw threaded spout member for such a connection affords easy emplacement and removal as desired.

That which is claimed is:

1. A sap collecting fitting comprising a body portion defining the juncture of at least two conduits, an open ended tubular spile segment extending from said body portion and defining an extension of one conduit from said body portion, said spile segment including a tapered portion and being adapted to be removably inserted into a tree bore, a plurality of radially projecting angularly spaced ribs extending axially of said tapered portion, said spile segments also having a plurality of grooves extending back from its terminal end, and at least one tubular conduit connector extending from said body portion and defining an extension of another conduit from said body portion.

2. A sap collecting fitting comprising a body portion defining the juncture of at least two conduits, an open ended tubular spile segment extending from said body portion and defining an extension of one conduit from said body portion, said spile segment including a tapered portion and being adapted to be removably inserted into a tree bore, at least one tubular conduit connector extending from said body portion and defining an extension of another conduit from said body portion, tree engaging first shoulder means limiting the extent of insertion of said spile segment also having a plurality of grooves ex- means on said body portion spaced from said first shoulder means and adapted for engagement by a tool for removing said spile segment from a tree bore.

3. A fitting useful in collecting sap from trees comprising a body portion defining the juncture of at least two conduits, an open ended tubular spile segment extending from said body portion and defining an extension of one conduit from said body portion, said spile segment being adapted to be removably inserted into a tree bore and having a cylindrical trunk portion of a length corresponding substantially to the thickness of the bark layer of a tree, said spile segment also having a tapered portion affording an extension of said trunk portion and adapted for disposition in the portion of a tree bore extending into the wood of the tree, and at least one conduit connector extending from said body portion and defining an extension of a conduit from said body portion.

4. A fitting useful in collecting sap from trees comprising a body portion defining the juncture of at least three conduits, an open ended tubular spile segment extending from said body portion and defining an extension of one conduit from said body portion, said spile segment being adapted to be removably inserted into a tree bore and having a cylindrical trunk portion of a length corresponding substantially to the thickness of the bark layer of a tree, said spile segment also having a tapered portion affording an extension of said trunk portion and adapted for disposition in the portion of a tree bore extending into the wood of the tree, a plurality of equiangularly spaced radially projecting ribs extending axially of the tapered portion of said spile segment and engageable with the wall surface of a tree bore upon insertion of said spile segment therein, at least one conduit connector extending from said body portion and defining an extension of a conduit from said body portion, and a clamping arm formed on said body portion and defining therewith a tube holding recess of a size to snugly receive and hold therein a plastic tube looped and attached to said conduit connector.

5. A fitting useful in collecting sap from trees comprising a body portion defining the juncture of at least three conduits, an open ended tubular spile segment extending from said body portion and defining an extension of one conduit from said body portion, said spile segment being adapted to be removably inserted into a tree bore and having a cylindrical trunk portion of a length corresponding substantially to the thickness of the bark layer of a tree, said spile segment also having a tapered portion affording an extension of said trunk portion and adapted for disposition in the portion of a tree bore extending into the wood of the tree, a plurality of equiangularly spaced radially projecting ribs extending axially of the tapered portion of said spile segment and engageable with the wall surface of a tree bore upon insertion of said spile segment therein, said spile segment having a reduced diameter end portion formed with spaced grooves affording radial fluid communication between the outer surface of said spile segment and the bore thereof, at least one conduit connector extending from said body portion and defining an extension of a conduit from said body portion, and a clamping arm formed on said body portion and defining therewith a tube holding recess of a size to snugly receive and hold therein a plastic tube looped and attached to said conduit connector.

6. A fitting useful in collecting sap from trees comprising a body portion defining the juncture of at least three conduits, an open ended tubular spile segment extending from said body portion and defining an extension of one conduit from said body portion, said spile segment being adapted to be removably inserted into a tree bore and having a cylindrical trunk portion of a length corresponding substantially to the thickness of the bark layer of a tree, said spile segment also having a tapered portion affording an extension of said trunk portion and adapted for disposition in the portion of a tree bore extending into the wood of the tree, a plurality of equiangularly spaced radially projecting ribs extending axially of the tapered portion of said spile segment and engageable with the wall surface of a tree bore upon insertion of said spile segment therein, said spile segment having a reduced diameter end portion formed with spaced grooves affording radial fluid communication between the outer surface of said spile segment and the bore thereof, a pair of parallel conduit connectors extending from said body portion and each defining an extension of a conduit from said body portion, and a pair of clamping arms formed on said body portion defining therewith a pair of cylindrical tube holding recesses having their axes parallel with the axes of said connectors, each of said tube holding recesses being of a size to snugly receive and hold therein a plastic tube looped and attached to one of said conduit connectors.

7. In a fitting for use in a sap collecting apparatus or the like, a tubular inlet connector adapted to have a plastic tube telescoped therover in tight fitting engagement for the delivery of fluid to said inlet, said inlet connector having a terminal portion formed with an annular outer surface adapted to be engaged by the inner surface of a tube telescoped thereover, said terminal portion also being formed with a tapered bore portion coaxial with said outer surface, said inlet connector terminating in an annular knife edge at which said tapered bore portion meets said annular outer surface.

8. A fitting for use in a sap collecting apparatus or the like comprising a body portion defining the intersection of at least three conduits, a tubular spile segment projecting from said body portion and defining an extension of one conduit from said body portion and adapted for removable insertion into a tree bore to receive sap therefrom, a tubular inlet connector projecting from said body portion and defining an extension of a conduit from said body portion, said connector being adapted to have a plastic tube telescoped thereover in tight fitting engagement for the delivery of sap from a source to said inlet, said inlet connector having a terminal portion formed with an annular outer surface adapted to be engaged by the inner surface of a tube telescoped thereover, said terminal portion also being formed with a tapered bore portion coaxial with said outer surface, said inlet connector terminating in an annular knife edge at which the said tapered bore portion meets said annular outer surface, and a tubular outlet connector projecting from said body portion and defining an extension of a conduit from said body portion, said outlet connector being adapted to have a plastic tube telescoped thereover in tight fitting engagement for conduction toward a reservoir of the sap entering said body portion from said inlet and from said spile segment.

9. Sap collecting apparatus comprising at least two spaced fittings each having a tubular connector portion, a plastic tube having its opposite ends mounted on said tubular connector portions respectively, and means formed on each of said fittings defining integral tube holding means snugly receiving and holding said tube therein, said tube having a length substantially greater than the space between said fittings and having a portion at each end thereof formed into a loop between the connector portion and the tube holding means of each of said fittings.

10. Sap collecting apparatus comprising a plurality of serially connected sap-collecting fittings each having a tubular spile segment for removable insertion into a tree bore and each having inlet and outlet connectors, a plastic tube connecting the outlet connector of one fitting with the inlet connector of the next fitting in the series, and means formed on said one and next fitting defining integral tube holding means snugly receiving and holding said tube therein, said tube having a length substantially greater than the space between said one and next fitting and having a portion adjacent said one fitting formed into a loop between the outlet connector and the tube holding means of said one fitting, and having a portion adjacent said next fitting formed into a loop between the inlet connector and the tube holding means of said next fitting.

11. Sap collecting apparatus comprising at least two spaced fittings each having a tubular connector portion, a plastic tube having its opposite ends mounted on said tubular connector portions respectively, and means formed on each of said fittings defining integral tube holding means snugly receiving and holding said tube therein, said tube having a length substantially greater than the space between said fittings and having a portion at each end thereof formed into a loop between the connector portion and the tube holding means of each of said fittings, the portion of said tube extending between said fittings being suspended in air spaced above the ground throughout the length thereof.

12. Sap collecting apparatus comprising a plurality of serially connected sap-collecting fittings each having a tubular spile segment for removable insertion into a tree bore and each having inlet and outlet connectors, a plastic tube connecting the outlet connector of one fitting with the inlet connector of the next fitting in the series, and means formed on said one and next fitting defining integral tube holding means snugly receiving and holding said tube therein, said tube having a length substantially greater than the space between said one and next fitting and having a portion adjacent said one fitting formed into a loop between the outlet connector and the tube holding means of said one fitting, and having a portion adjacent said next fitting formed into a loop between the inlet connector and the tube holding means of said next fitting, the portion of said tube extending between said fittings being suspended in air and spaced above the ground throughout the length thereof.

13. A fitting comprising a body portion defining the juncture of at least two conduits, a tubular segment extending from said body portion and defining an extension of one conduit from said body portion, at least one tubular conduit connector extending from said body portion and defining an extension of another conduit from said body portion, said conduit connector being adapted to have a plastic tube of predetermined size snugly telescoped thereon, and clamping means on said body portion of a size to snugly clamp to said body portion a plastic tube of said predetermined size.

14. A fitting comprising a body portion defining the juncture of at least two conduits, a tubular segment extending from said body portion and defining an extension of one conduit from said body portion, at least one tubular conduit connector extending from said body portion and defining an extension of another conduit from said body portion, said conduit connector being adapted to have a plastic tube of predetermined size snugly telescoped thereon, a clamping arm on said body portion forming therewith a recess of a size to snugly receive and hold therein a plastic tube of said predetermined size.

15. A sap collecting fitting comprising a body portion defining the juncture of at least three conduits, a tubular spile segment extending from said body portion and defining an extension of one conduit from said body portion, said spile segment being adapted to be removably inserted into a tree bore, a pair of tubular conduit connectors extending from said body portion and each defining an extension of a conduit from said body portion, said conduit connectors each being adapted to have a plastic tube of predetermined size snugly telescoped thereon, and a pair of clamping arms on said body portion forming therewith a pair of cylindrical recesses having restricted side openings, said recesses each having a diameter to snugly receive and hold therein a plastic tube of said predetermined size, and said side openings having a width less than the diameter of said recesses.

References Cited in the file of this patent

UNITED STATES PATENTS

| | | |
|---|---|---|
| Re. 8,495 | Sargent | Nov. 19, 1878 |
| 117,326 | Post | July 25, 1871 |
| 227,074 | Taft | Apr. 27, 1880 |
| 270,226 | Kimball | Jan. 9, 1883 |
| 768,188 | McIntyre | Aug. 23, 1904 |
| 773,965 | McIntyre | Nov. 1, 1904 |
| 1,154,679 | Whitcomb | Sept. 28, 1915 |
| 1,207,444 | Soule | Dec. 5, 1916 |
| 1,221,509 | Chesley | Apr. 3, 1917 |
| 1,326,250 | Brown | Dec. 30, 1919 |
| 1,366,054 | Blood | Jan. 18, 1921 |
| 2,449,778 | Hyde | Sept. 21, 1948 |
| 2,619,386 | Dalrymple | Nov. 25, 1952 |
| 2,733,940 | Millar | Feb. 7, 1956 |
| 2,811,982 | De Young | Nov. 5, 1957 |
| 2,877,601 | Griggs | Mar. 17, 1959 |

FOREIGN PATENTS

| | | |
|---|---|---|
| 591,518 | France | Apr. 11, 1925 |
| 908,723 | France | Oct. 15, 1945 |
| 1,098,634 | France | Mar. 9, 1955 |